United States Patent [19]

Klein

[11] 3,750,923
[45] Aug. 7, 1973

[54] COATING APPARATUS
[76] Inventor: Norman E. Klein, Rt. 2, Inman, S.C.
[22] Filed: Feb. 25, 1972
[21] Appl. No.: 229,607

Related U.S. Application Data
[62] Division of Ser. No. 858,094, Sept. 15, 1969, Pat. No. 3,703,154

[52] U.S. Cl. .............................. 226/112, 226/158
[51] Int. Cl. ............................................ B65h 17/42
[58] Field of Search .................. 226/165, 112, 108, 226/167, 158, 163, 164, 166, 162

[56] References Cited
UNITED STATES PATENTS
3,583,268  5/1970  Scribner............................. 226/112
3,165,661  1/1965  Taleff............................. 226/112 X Primary Examiner—Allen N. Knowles
Attorney—Norman C. Armitage et al.

[57] ABSTRACT

Apparatus for extruding a coating around a core including an extruder screw, stock feeder means operatively associated with the screw, and core coating means disposed adjacent the delivery portion of the screw; the stock feeder comprising pairs of opposed finger elements positioned to contact strip stock and means for sequentially moving the pairs of finger elements to engage the strip stock and to advance same into contact with the extruder screw; the coating means comprising a die having an opening therethrough, a guide member disposed within the opening forming a cavity through the die, means for withdrawing a coated core material from the die and means adjacent the cord withdrawal means responsive to variations in the thickness of the coated core to control the withdrawal means.

7 Claims, 5 Drawing Figures

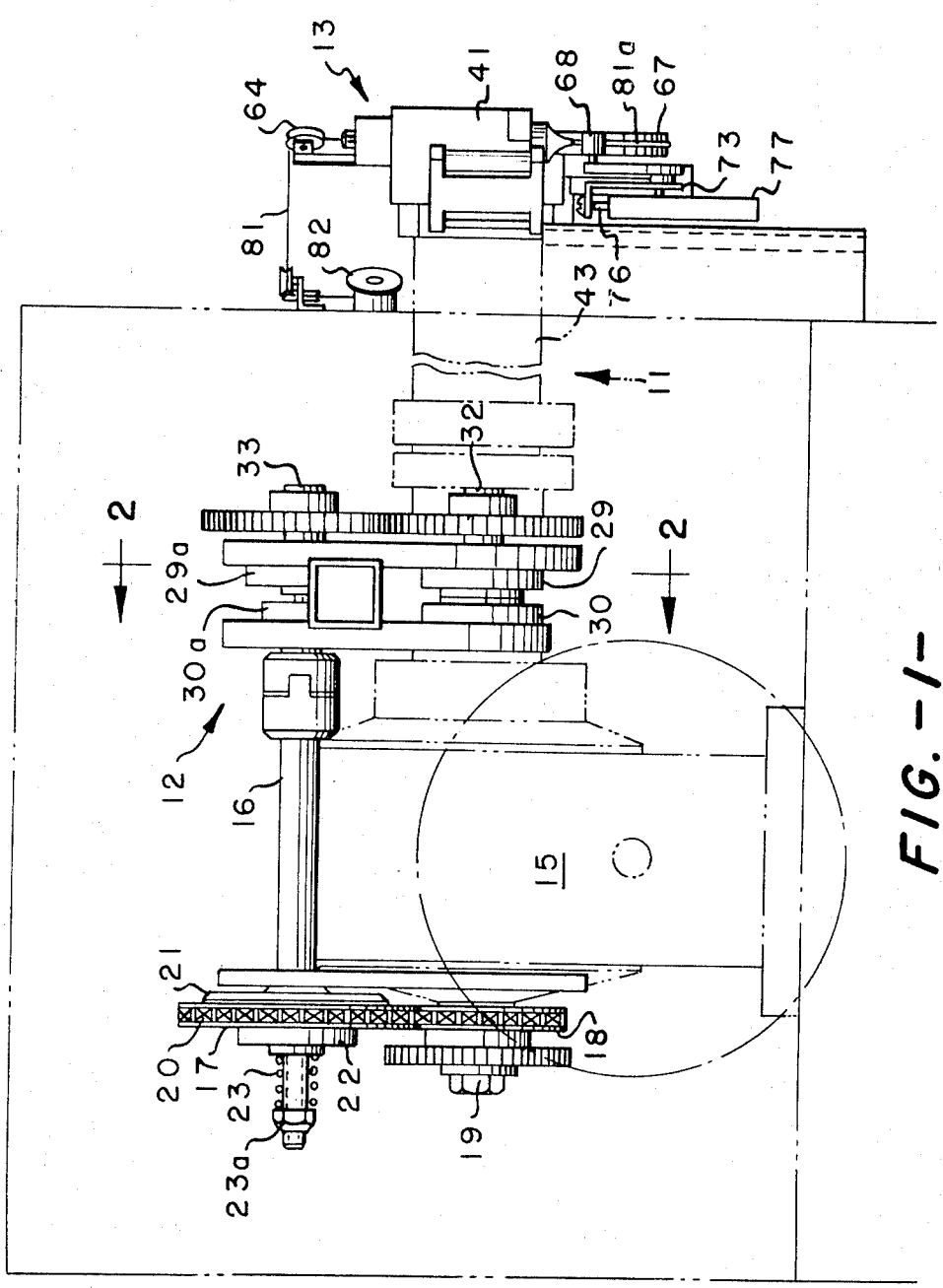
FIG.-1-

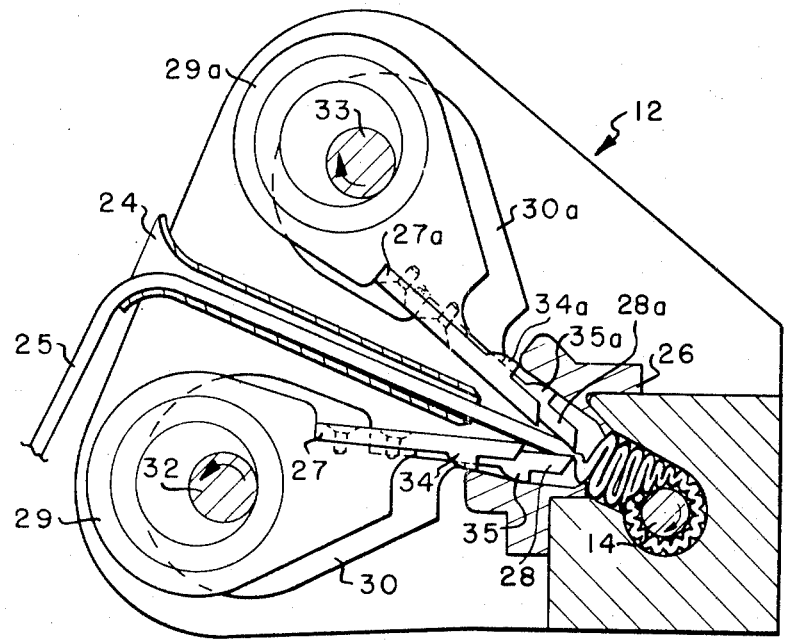
FIG.-2-
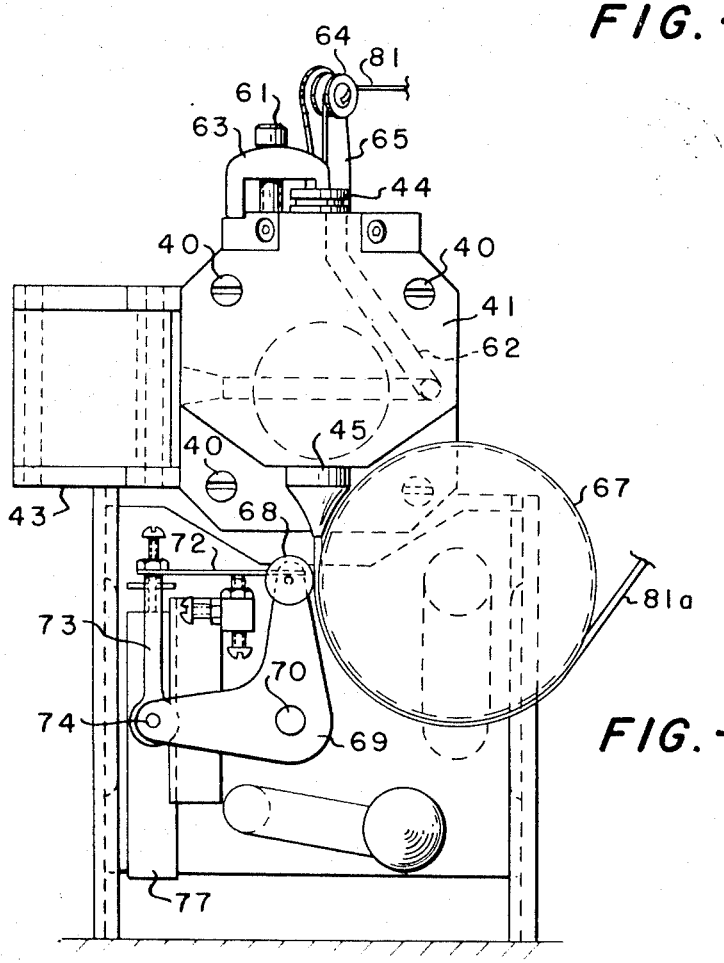
FIG.-3-

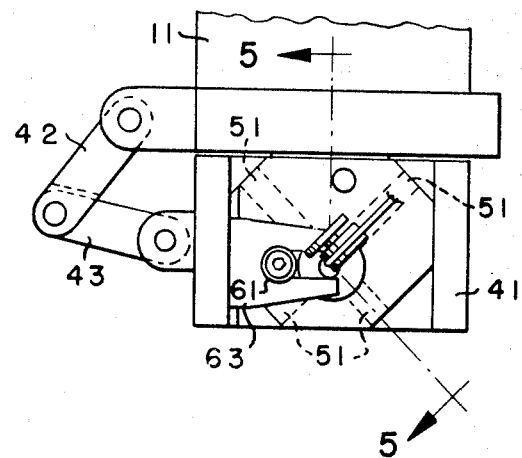
FIG.-4-
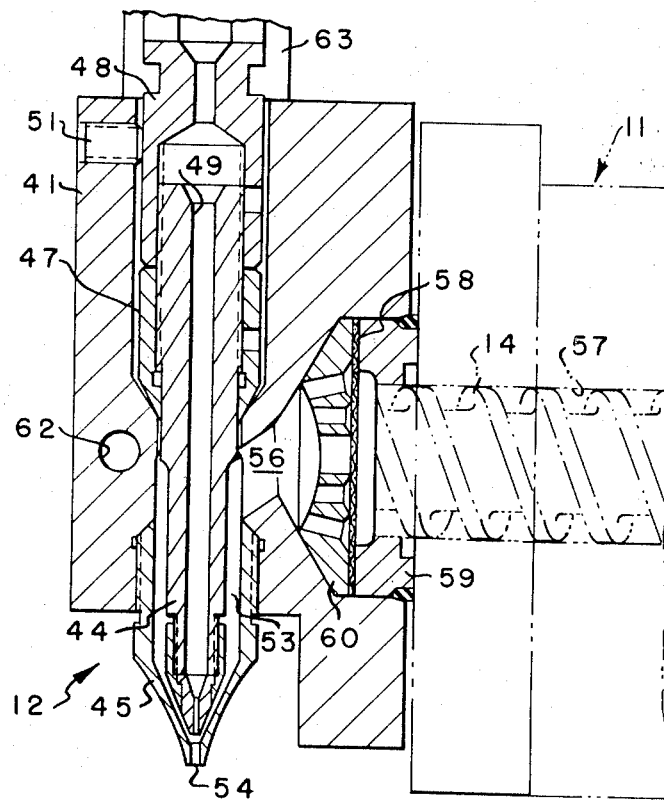
FIG.-5-

COATING APPARATUS

This is a division of application Ser. No. 858,094, filed Sept. 15, 1969, now U.S. Pat. No. 3,703,154.

This invention relates to apparatus for extruding a coating around a core, and more particularly relates to apparatus for automatically feeding strip stock to an extruder and apparatus for coating a core such as a reinforcing cord.

In the continuous extrusion of thermoplastic materials such as rubber, plastics, etc., one of the problems is the necessity for maintaining an adequate supply of the feed stock. With extruders which utilize granular material, it is customary to maintain a supply of granules in a hopper and to gravity feed them to the extruder. However, in the extrusion of rubber or similar materials, it generally is not practical to employ a granular material, but instead, the feed stock customarily is in strip form. Since the strip stock is relatively tough and resists deformation, it is necessary to apply a continuous positive force to the stock to insure an adequate supply to the feeder.

The present invention provides novel apparatus for extruding a coating around a core. Furthermore, the invention provides a new apparatus for continuously feeding strip stock to an extruder. Moreover, the invention provides novel apparatus for the coating of a core material such as a cord.

The invention will be described in detail with reference to the accompanying drawings in which:

FIG. 1 is a side elevation of one form of apparatus of the invention;

FIG. 2 is an enlarged sectional view taken along line 2—2 of FIG. 1;

FIG. 3 is an enlarged right end elevation of the apparatus shown in FIG. 1;

FIG. 4 is a partial top elevation of the portion of the apparatus shown in FIG. 3; and FIG. 5 is a further enlarged sectional view taken along line 5—5 of FIG. 4.

As shown in the drawings, an extruder 11 has associated therewith a stock feeder 12 and a cord coating portion 13. Extruder 11 has a screw 14 (FIG. 2) which is driven through a gear box 15. The feeder 12 is operatively connected to gear box 15 through shaft 16 and sprockets 17 and 18 which are respectively disposed on shaft 16 and screw shaft 19. Sprockets 17 and 18 are interconnected by chain 20. Shaft 16 and sprocket 17 are connected by a clutch assembly including clutch plate 21, thrust bearing 22, spring 23 and threaded nut 23a. The degree of compression of spring 23 by the adjustment of nut 23a provides a constant torque which insures a uniform feed pressure of stock into the extruder 11.

The feeder 12 (FIG. 2) includes a feed chute portion 24 through which strip stock 25 is conveyed to funnel portion 26 and into contact with screw 14. The feeder also includes pairs of opposed finger elements 27, 27a, 28 and 28a. The pairs of finger elements are disposed adjacent the edges of the strip stock. The finger elements 27, 27a, 28 and 28a are secured respectively to connecting rods 29, 29a 30 and 30a. Connecting rods 29 and 30 are affixed to crank shaft 32 with each being mounted eccentrically to the other. Likewise, connecting rods 29a and 30a are affixed to crank shaft 33 and mounted eccentrically to the other. A spacial relationship between the respective connecting rods is established to position finger elements 27 and 27a in a retracted position when finger elements 28 and 28a are in an extended position and vice versa. Each of the finger elements has a projection (34, 34a, 35 and 35a) intermediate its length and adjacent the internal cam surface of funnel 26. The projection serves as a raised fulcrum which contacts the cam surface of funnel 26 during the operation of the feeder.

The cord coating portion 13 includes a cross head die 41 connected to extruder 11 by bolts 40 and movable with respect thereto on brackets 42 and 43 (FIGS. 3 and 4) which are pivotally affixed to each other with their opposite ends mounted on the extruder 11 and the die 41. Die 41 (FIG. 5) includes a central guide member 44 and a coating sizing tip 45 threaded into the lower portion of die 41. The upper portion of guide member 44 is threaded to receive tapered nut 47 and lock nut 48. Guide 44 has a longitudinal opening 49 for the passage of a cord therethrough. Set screws 51 are located in die 41 in an opposed quadrature arrangement to facilitate proper alignment of the guide 44. Proper positioning of the guide in the opening of die 41 forms a cavity 53 which connects to the opening 54 in tip 45 and also communicates with a throat 56 adjacent the bore 57 of the extruder 11.

A screen 58 is disposed over the end of bore 57 and maintained in proper position by collar 59 and a tapered perforated support 60. Die 41 has a passage 62 therethrough for the circulation of a heating fluid. The guide member 44 is maintained in position within die 41 with cap screw 61 and yoke 63 which presses against the upper surface of the guide. The use of a cap screw and yoke facilitates the rapid removal of the guide for easy cleaning or other purposes. Proper repositioning of the guide is insured by set screws 51.

A guide roll 64 is mounted on bracket 65 above the opening 49 of guide 44. Also, a driven grooved capstan 67 is disposed adjacent the opening 54 of coating sizing tip 45 to draw the coated cord from the tip.

To control the thickness of the coating on the cord, a freely rotatable roller 68 is mounted on an arm 69 which pivots about shaft 70. Roller 68 is biased against capstan 67 by strip spring 72 which is connected to arm 69 through link 73. Link 73 is pivotally attached to arm 69 by shaft 74. Movement of rod 76 (FIG. 1) attached to one end of link 73 in turn moves the armature of a linear variable differential transformer 77 which is connected to an amplifier-controller (not shown).

In the operation of the apparatus of the invention, a cord 81 from a supply package 82 is passed over a series of guide rolls including roller 64 and into the opening 49 of the guide member 44. Simultaneously, rubber stock 25 is passed through chute portion 24 of the feeder where the movement of fingers 27, 27a, 28 and 28a (hereinafter described) forces the strip stock into contact with screw 14. Screw 14 forces the stock through bore 57 of the extruder past screen 58 and perforated support 60. The rubber stock then is forced through throat 56 into cavity 53 where it contacts the core 81 forming a coating thereon. Coated cord 81a is drawn from the tip 54 by capstan 67.

The strip stock 25 is forced into contact with the extruder screw 14 by the cooperative action of finger elements 27 and 27a in combination with elements 28 and 28a. Rotation of crank shafts 32 and 33 moves fingers 27 and 27a to a rear position with respect to the strip stock while fingers 28 and 28a are in a forward position and vice versa as the crank shafts rotate. The counter clockwise rotation of the shaft 32 and the clockwise rotation of the shaft 33 and the movement of connecting rods 29, 29a, 30 and 30a resulting from such rotation, move the forward tips of finger elements 27, 27a, 28 and 28a in elongated orbital paths approximately elliptical in shape. The tips of fingers 27 and 28 will orbit in a clockwise direction while the tips of fingers 27a and 28q will orbit in a counter clockwise direction. Crank shafts 32 and 33 are geared for synchronous motion and timed so that forward and backward components of the motions of the tips of fingers 27 and 27a are in the same direction and phase but transverse components are opposite in direction and phase.

Further rotation of the crank shafts causes the tips of the finger elements to orbit as projections 34 and 34a contact the inner surface of funnel portion 26 as the finger elements move forward. Since the fingers are pinching the stock, the strip stock is advanced by this orbital motion of the finger tips into contact with the extruder screw 14. When the fingers 27 and 27a reach their forwardmost point of travel, fingers 28 and 28a disposed at the opposite side of the strip stock engage the strip stock at a more rearward point. Additional rotation of the crank shafts 32 and 33 causes fingers 28 and 28a to move forward and the projections 35 and 35a thereon to contact the upper cam surface of funnel 26 in the same manner as fingers 27 and 27a and thereby force additional quantities of the strip stock into contact with screw 14 as the fingers are advanced in a forward direction. This "pogo stick" action of the fingers 27 and 27a and fingers 28 and 28a is repeated alternately with a high degree of frequency to automatically and continuously feed the strip stock into contact with the screw 14.

The thickness of the coated cord 81a is controlled by varying the speed of the capstan 67 which withdraws the cord from the die tip 45. Variations in the cord thickness change the position of roller 68 which is biased against the cord and capstan 67. For example, if the cord becomes thicker, roller 68 moves away from capstan 67 causing arm 69 to pivot about shaft 70 and move link 73 which also is pivotally attached thereto in a downward direction. Downward movement of link 73 causes rod 76 to move an armature (not shown) downwardly in linear variable differential transformer 77. This movement of the armature in transformer 77 sends a signal to amplifier and control elements to change the electric current to a motor (not shown in the drawings) which drives capstan 67 and thereby increases the speed of the capstan so that the coated cord is withdrawn from the die at a faster rate. This faster rate of withdrawal spreads the available rubber coating over a greater length of cord and as a result reduces the diameter thereof.

The above description and drawings show that the present invention provides a novel apparatus for extruding a coating around a core. Also, the invention provides an automatic strip stock feeder to continuously feed rubber or plastic stock to an extruder. Moreover, the design of the stock feeder facilitates integration of the feeder with the extruder due to its small size and space requirements. Further, the stock feeder provides positive feeding of the strip stock at all times. In addition, the invention provides a new die design for coating a core material such as a reinforcing cord which does not require a bleed vent, thus minimizing rubber waste. Also, the die design provides ease of opening for cleaning or other purposes. Furthermore, the apparatus of the invention includes novel means for controlling the thickness of the coating.

It will be apparent from the above description and drawings that various modifications may be made in the detailed designs and procedures described above within the scope of the invention. For example, a plurality of cords may be coated simultaneously. Also, the positon of the feeder with respect to the rotation of the screw may be different. Therefore, the above description and drawings are intended to illustrate specific embodiments of the invention, and the scope of the invention is to be limited only by the following claims.

That which is claimed is:

1. A strip stock feeder for an extruder including a first pair of opposed finger elements positioned adjacent one edge of said strip stock, a second pair of opposed finger elements positioned adjacent the other edge of said strip stock, one finger element of each pair of finger elements being disposed on one side of said strip stock and the other finger element of each pair being disposed on the other side of said strip stock, and means for sequentially moving each pair of finger elements together to engage said strip stock and advance same.

2. A strip feeder according to claim 1 wherein said means for moving said finger elements includes means for imparting an orbital motion to said finger elements.

3. A strip feeder according to claim 1 wherein said means for moving said finger elements includes means for imparting an approximately elliptical motion to said finger elements.

4. A strip feeder according to claim 1 wherein said means for moving said finger elements includes means for imparting motion of adjacent coacting fingers in a mirror image.

5. A strip feeder according to claim 1 wherein said means for moving said finger elements includes connecting rods mounted on a crank shaft.

6. A strip feeder according to claim 1 wherein one of each pair of finger elements is disposed above said strip stock and the other element of each pair is disposed below said strip stock.

7. A strip feeder according to claim 1 wherein said feeder includes a funnel portion providing a cam surface for fulcrum guidance of said finger elements in orbital motion thereabout.

* * * * *